US011922914B2

(12) United States Patent
Koizumi

(10) Patent No.: US 11,922,914 B2
(45) Date of Patent: Mar. 5, 2024

(54) DESK BELL

(71) Applicant: Koizumi Factory Corporation, Takaoka (JP)

(72) Inventor: Toshihiro Koizumi, Takaoka (JP)

(73) Assignee: Koizumi Factory, Takaoka (JP)

( * ) Notice: Subject to any disclaimer, the term of this patent is extended or adjusted under 35 U.S.C. 154(b) by 902 days.

(21) Appl. No.: 16/931,091

(22) Filed: Jul. 16, 2020

(65) Prior Publication Data

US 2020/0349913 A1 Nov. 5, 2020

Related U.S. Application Data

(63) Continuation of application No. PCT/JP2018/036335, filed on Sep. 28, 2018.

(30) Foreign Application Priority Data

Jan. 26, 2018 (JP) ................................ 2018-011609

(51) Int. Cl.
*G10K 1/072* (2006.01)
*G10K 1/07* (2006.01)

(52) U.S. Cl.
CPC .............. *G10K 1/072* (2013.01); *G10K 1/07* (2013.01)

(58) Field of Classification Search
CPC ................................ G10K 1/072; G10K 1/07
See application file for complete search history.

(56) References Cited

U.S. PATENT DOCUMENTS 578,268 A * 3/1897 Sanford .................. E21B 21/00 116/166
610,240 A * 9/1898 Oberle ................... G10K 1/072 116/161
1,798,207 A * 3/1931 Ko Eune ................ G10K 1/072 116/148
1,848,020 A * 3/1932 Merrill ..................... G10K 1/32 116/150

(Continued)

FOREIGN PATENT DOCUMENTS

GB 238989 A * 9/1925
JP U63170900 A 11/1988

OTHER PUBLICATIONS

Extended European Search Report dated May 14, 2021 for Application No. EP 18902857.4, ten pages.

(Continued)

*Primary Examiner* — John Fitzgerald
*Assistant Examiner* — Tania Courson
(74) *Attorney, Agent, or Firm* — David L. Hoffman; Nolan Heimann LLP

(57) ABSTRACT

A desk bell that has a good sound reverb and a long lingering sound includes a swingably supported bell body and striking section that hits the bell body. The striking section includes a striker, an operating part for operating the striker, and separating part that quickly separates the striker from the bell body after the striker striking the bell body. The bell body is placed and supported on or point-supported on a supporting member. The bell body has a conical shape with an open bottom or an inverted bowl shape and has an inner top part placed and supported on or point-supported on the supporting member. The striker is disposed inside the bell body.

9 Claims, 3 Drawing Sheets

(56) References Cited

U.S. PATENT DOCUMENTS

| | | | | |
|---|---|---|---|---|
| 2,407,702 | A * | 9/1946 | Jowett | G10K 1/07 116/149 |
| 2,880,693 | A * | 4/1959 | Rea | G10K 1/07 116/171 |
| 6,739,282 | B1 * | 5/2004 | Yuan | G10K 1/071 116/167 |
| 7,225,753 | B1 * | 6/2007 | Lo | G10K 1/072 116/167 |
| 2005/0157484 | A1 * | 7/2005 | Fu | B62J 3/04 362/86 |
| 2007/0144426 | A1 | 6/2007 | Lo | |

OTHER PUBLICATIONS

U.S. Pat. No. 225,690, A, issued Mar. 23, 1880 to Connell, 2 pages.
U.S. Pat. No. 112,907, A, issued mar. 21, 1871 to Dierkes, 2 pages.
International Search Report dated Dec. 11, 2018 for Application No. PCT/JP2018/036335.

* cited by examiner

DESK BELL

CROSS REFERENCE TO RELATED APPLICATION

This application is a continuation of International Patent Application No. PCT/JP2018/036335, having an international filing date of Sep. 28, 2018, which designated the United States, the entirety of which is incorporated herein by reference. Japanese Patent Application No. 2018-011609 filed on Jan. 26, 2018 is also incorporated herein by reference in its entirety.

BACKGROUND

The present disclosure relates to a desk bell that makes a sound by striking by a striker.

Conventional general bells include a bell body connected to a handle or the like, and a striking ball suspended inside the bell body.

Japanese Utility Model Laid-Open No. S63-170900 discloses an electromagnetic bell in which a bell bowl hit by a striking ball of a hammer is fixed.

However, the bell bowl disclosed in the Japanese Utility Model Laid-Open No. 63-170900 is fixed by a mounting part, and the vibration is limited, so that the sound reverb is short.

DESCRIPTION OF EXEMPLARY EMBODIMENTS

Figure 1:
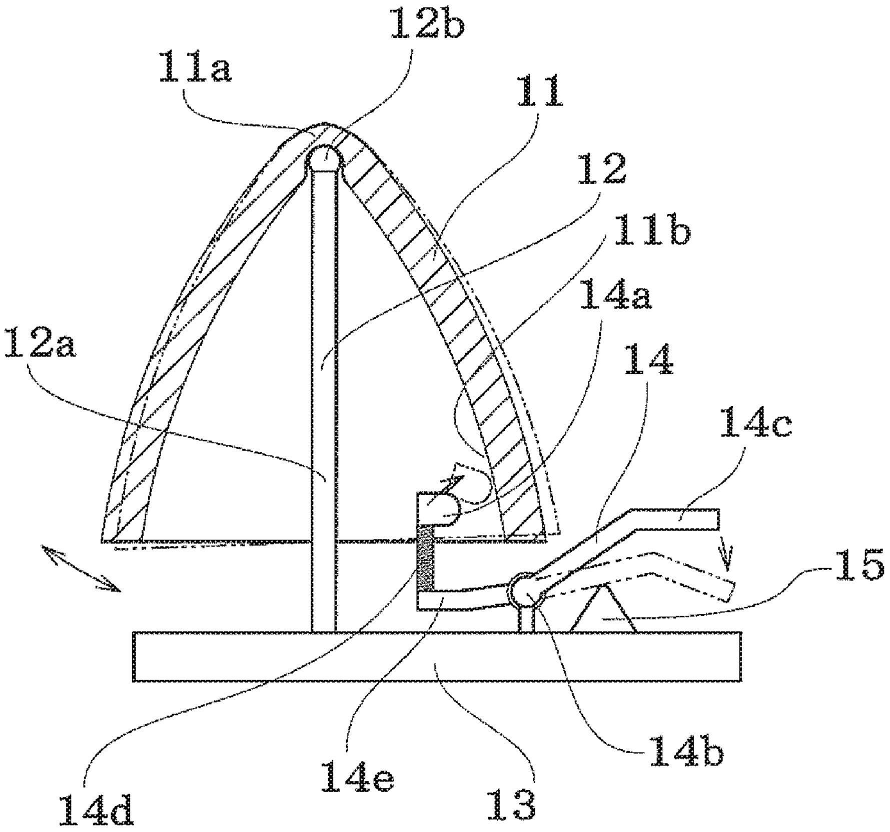
FIG. 1 illustrates a first embodiment of a desk bell according to the disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

An object of the disclosure is to provide a desk bell that has a good sound reverb and a long lingering sound.

A desk bell according to the disclosure includes a swingably supported bell body, and a striking section that hits the bell body, wherein the striking section has a striker, an operating part for operating the striker, and separating part that quickly separates the striker from the bell body after the striker striking the bell body.

Here, The definition of a swingably supported bell body means that the bell body is supported so that the bell body swings when a striker hits the bell body.

The definition of a swingably supported bell body includes an aspect in which the bell body is placed and supported on a supporting member, or an aspect in which the bell body is point-supported by a supporting member at a supporting point part.

When the bell body is placed and supported on the supporting member as described above, the bell body can be easily attached, detached and replaced, and when the bell body is point-supported, the bell body itself can be rotated.

Here, the aspect in which the bell body is point-supported includes, for example, a case in which the bell body is formed with an inversely convex shaped part to be point-supported like a balancing toy.

In the disclosure, the separating part of the striker included in the striking section represents means to generate a reaction force against the striker to quickly separate from the bell body after striking so that the striker does not interfere with the swing movement of the bell body part due to the striker that has struck the bell body.

Although there is no limit to the separating part if the object here can be achieved, however, examples include a structure in which a stopper is provided to stop an operating part for striking operation so that the striker is repelled by a repulsive force from the stopper based on the principle of leverage after moving in a direction in which the operating part operates the striker, a structure in which the gravity of the striker acts in a separating direction, a structure in which elastic force, magnet, or the like acts to pull back the striker in the separating direction.

In the disclosure, the bell body has a conical shape with an open bottom or an inverted bowl shape, and may have an inner top part thereof supported by a supporting member to have a striker disposed inside the bell body.

In the desk bell according to the disclosure, the striker moves back quickly after striking. This makes it possible to enjoy a sound with good, long reverb and timbre.

For example, if the bell body is modified like a doll, the doll appears to bow in the front-rear direction, and an unprecedented effect is obtained as a counter bell.

Exemplary embodiments are described below. Note that the following exemplary embodiments do not in any way limit the scope of the content defined by the claims laid out herein. Note also that all of the elements described in the present embodiment should not necessarily be taken as essential elements.

Examples of structures of desk bells according to the disclosure are described below with reference to the drawings.

FIG. 1 illustrates a first embodiment.

A shaft-shaped supporting member 12 is disposed upright from a base part 13.

The supporting member 12 has a spherical supporting point **12*b* at the head part of a shaft part 12*a*, and the supporting point 12*b* supports an inner top part 11*a* of a bell body 11 to make the bell body 11** swingable.

The shape of the bell body 11 is not limited, but in this embodiment, the bell body 11 has a vessel-like conical shape with an open bottom.

The bell body 11 may have an inverted bowl shape or other irregular shapes.

The swing structure of the bell body 11 in this embodiment is a combination of a spherical concave shape at the inner top part of the bell body 11 and a spherical convex part at the head part of the supporting member 12, but may be a connection by an elastic material.

Here, if the inner top part 11*a* of the bell body 11 is placed and supported on the head part of the supporting member 12, the bell body can be easily removed, and if it is point-supported on a spherical convex part or a projected supporting point part, the bell body can also rotate freely.

The material of the bell body is not particularly limited, but metal is preferable.

Examples of the metal include brass (brass alloy), tin, and stainless steel.

There is made a predetermined space between the lower end of the bell body 11 and the upper surface of the base part 13 to dispose striking section 14.

The striking section 14 is configured such that a striker 14*a* disposed inside the bell body 11 and an operating part 14*c* located outside the bell body are used as a lever around a fulcrum part 14*b* disposed therebetween and thereby the striker 14*a* can rotate upward and downward.

The striker 14*a* is connected to one end of an elastic part 14*d* such as a spring material disposed upright and upward from an actuating rod 14*e* to absorb the shock generated when the striker 14*a* strikes the bell body 11.

In the first embodiment, a stopper 15 is disposed below the operating part 14*c* including an operating rod. Thereby, when the operating part 14*c* is pushed downward by a finger, the operating rod hits the stopper 15 to generate a repulsive force from the stopper to the operating rod. This repulsive force causes the striker 14*a* to quickly separate from the swinging bell body 11.

As a result, the sound of the bell body is not muted.

Here, the base part 13 may have a slide mechanism disposed to enable the fulcrum part 14*b* to adjust the interval between the striker 14*a* and an inner surface part 11*b* of the bell body 11, or to adjust the height or position of the stopper 15.

Thereby, the position can be adjusted according to the hitting condition of the striker 14*a* or the swinging condition of the bell body 11.

Figure 2:
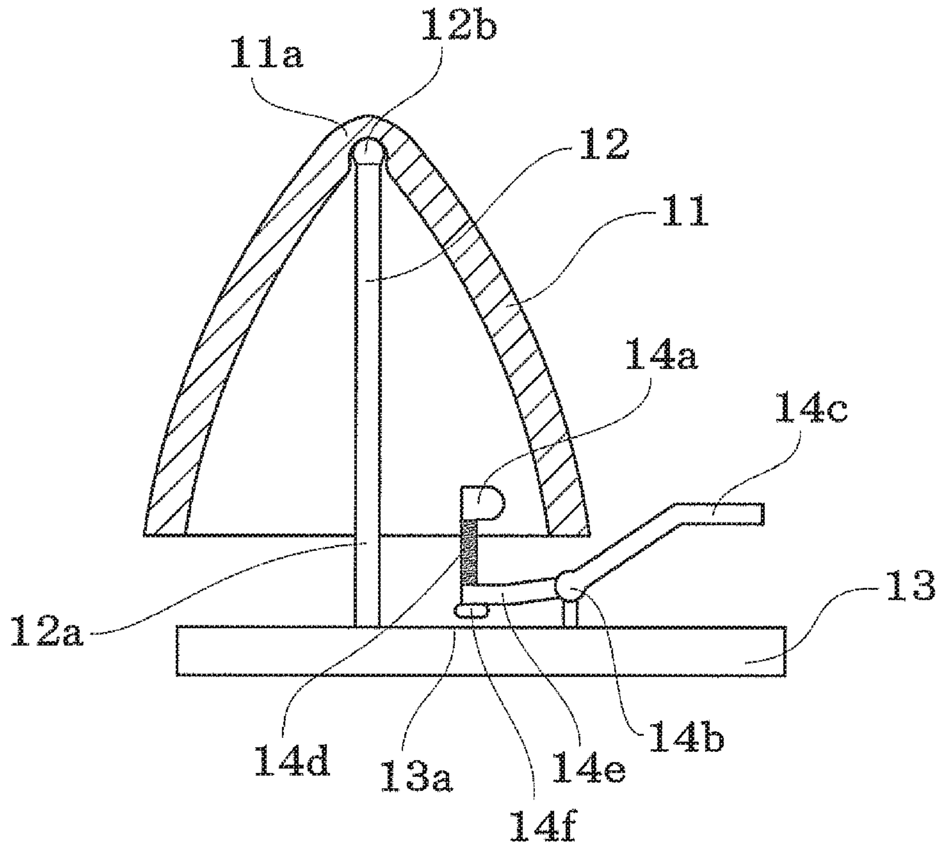
FIG. 2 illustrates a second embodiment of a desk bell according to the disclosure.

A second embodiment is illustrated in FIG. 2.

Striking section of this embodiment is different from that of the first embodiment.

In this embodiment, a weight 14*f* is attached to an actuating rod 14*e* at the lower side of the rod end side.

A striker 14*a* strikes the inside of a bell body 11 by the principle of leverage, and then it acts as separating part that quickly separates from the bell body 11 by the gravity of the weight 14*f*.

In the disclosure, instead of this weight 14*f*, a magnet may be attached to one of the end part of the actuating rod 14*e* and an upper surface part 13*a* of a base part 13 and a ferromagnetic material may be attached to the other to utilize the magnetic force, or an elastic member such as a tension spring may be used. The elastic member may be used between the end part of the actuating rod 14*e* and the upper surface part 13*a* of the base part 13.

Figure 3:
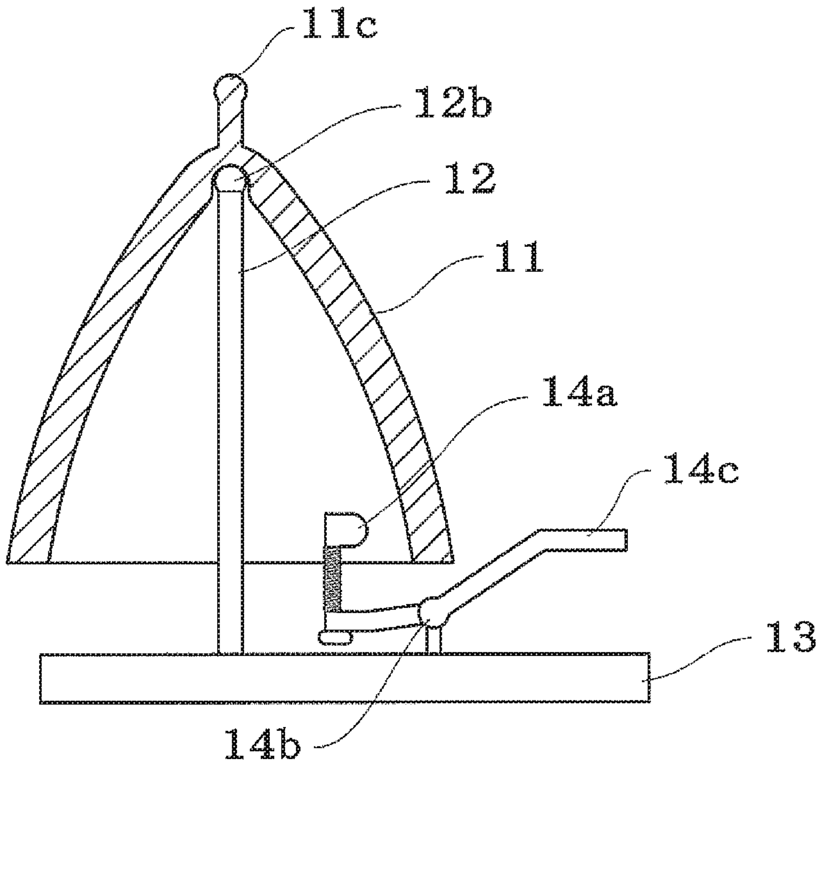
FIG. 3 illustrates a third embodiment of a desk bell according to the disclosure.

A third embodiment is illustrated in FIG. 3.

In this embodiment, a knob part 11*c* that can be pinched with fingers is made on the top of a bell body 11.

This facilitates removal from and replacement at a supporting member 12 and the like by pinching the knob part 11*c*.

The bell according to the disclosure has the bell body swingably supported so that the sound has good reverb, and the bell can be used as various desk bells.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A desk bell comprising:

a supporting member;

a bell body swingably supported by the supporting member; and a striking section that hits the bell body, wherein the striking section includes a striker, an operating part for operating the striker, and a fulcrum part disposed between the striker and the operating part, and wherein the striker, the operating part and the fulcrum part form a lever, wherein the striking section further includes a stopper that generates a repulsive force so that the striker is repelled after moving in a direction in which the operating part operates the striker, the stopper quickly separates the striker from the bell body after the striker striking the bell body, wherein the bell body is placed and supported on or point-supported on the supporting member so as to be swingably supported, wherein the bell body has a conical shape with an open bottom or an inverted bowl shape, and has an inner top part placed and supported on or point-supported on the supporting member, and wherein the striker of the striking section is disposed inside the bell body.

2. The desk bell as defined in claim 1, wherein the bell body includes a spherical concave part at the inner top part of the bell body, and the supporting member includes a spherical convex part at a head part of the supporting member.

3. The desk bell as defined in claim 1, wherein the bell body includes a knob part protruding from an outer top of the bell body.

4. A desk bell comprising:

a supporting member;

a bell body swingably supported by the supporting member; and a striking section that hits the bell body, wherein the striking section includes a striker, an operating part for operating the striker, and a fulcrum part disposed between the striker and the operating part, wherein the striker, the operating part and the fulcrum part form a lever, the striking section further includes a weight so that the gravity of the weight acts in a direction in which the striker separates from the bell body after moving in a direction in which the operating part operates the striker, wherein the weight quickly separates the striker from the bell body after the striker striking the bell body, wherein the bell body is placed and supported on or point-supported on the supporting member so as to be swingably supported, wherein the bell body has a conical shape with an open bottom or an inverted bowl shape, and has an inner top part placed and supported on or point-supported on the supporting member, and wherein the striker of the striking section is disposed inside the bell body.

5. The desk bell as defined in claim 4, wherein the bell body includes a spherical concave part at the inner top part of the bell body, and the supporting member includes a spherical convex part at a head part of the supporting member.

6. The desk bell as defined in claim 4, wherein the bell body includes a knob part protruding from an outer top of the bell body.

7. A desk bell comprising:

a supporting member;

a bell body swingably supported by the supporting member; and a striking section that hits the bell body, wherein the striking section includes a striker, an operating part for operating the striker, and a fulcrum part disposed between the striker and the operating part, wherein the striker, the operating part and the fulcrum part form a lever, the striking section further includes an elastic member or magnet that acts pull back the striker after moving in a direction in which the operating part operates the striker, the elastic member or magnet quickly separates the striker from the bell body after the striker striking the bell body, wherein the bell body is placed and supported on or point-supported on the supporting member so as to be swingably supported, wherein the bell body has a conical shape with an open bottom or an inverted bowl shape, and has an inner top part placed and supported on or point-supported on the supporting member, and wherein the striker of the striking section is disposed inside the bell body.

8. The desk bell as defined in claim 7, wherein the bell body includes a spherical concave part at the inner top part of the bell body, and the supporting member includes a spherical convex part at a head part of the supporting member.

9. The desk bell as defined in claim 7, wherein the bell body includes a knob part protruding from an outer top of the bell body.

* * * * *